United States Patent
Altermatt

[15] 3,700,700
[45] Oct. 24, 1972

[54] PROCESS FOR THE MANUFACTURE OF AMINOANTHRAQUINONES

[72] Inventor: Hans Altermatt, Reinach, Basel-Land, Switzerland

[73] Assignee: Ciba-Geigy AG, Basel, Switzerland

[22] Filed: Dec. 8, 1969

[21] Appl. No.: 883,343

Related U.S. Application Data

[63] Continuation-in-part of Ser. No. 631,879, April 19, 1967, abandoned.

[30] Foreign Application Priority Data

May 11, 1966  Switzerland..............6880/66

[52] U.S. Cl. ..............260/371, 260/329.2, 260/377, 260/378, 260/380, 260/381

[51] Int. Cl. ..............................................C09b 1/22
[58] Field of Search..............260/377, 378, 380, 381

[56] References Cited

UNITED STATES PATENTS 3,342,831   9/1967   Braun et al. ..............260/377

Primary Examiner—Lorraine A. Weinberger
Assistant Examiner—E. Jane Skelly
Attorney—Harry Goldsmith, Joseph G. Kolodny and Mario A. Monaco

[57] ABSTRACT

Process for the preparation of anthraquinones containing a primary amino group by heating the corresponding aminoanthraquinones containing a secondary or tertiary amino group in an organic solvent.

15 Claims, No Drawings

PROCESS FOR THE MANUFACTURE OF AMINOANTHRAQUINONES

This is a continuation in part application of our co-pending application Ser. No. 631,879, filed Apr. 19, 1967, now abandoned.

It is known from German Specification 1,205,550 that aminoanthraquinones can be obtained by allowing strong sulphuric acid, oleum, chlorosulphonic acid or a melt of aluminum chloride and a material which lowers the melting point to act on cyclohexylaminoanthraquinones which may be optionally substituted in the anthraquinonyl residue. When sulphuric acid or oleum are used, nitrile groups or amide groups may at the same time be saponified or sulphonic acid groups may be simultaneously introduced. In the above-mentioned Specification the advantages compared with earlier known processes of manufacture are also mentioned, especially the process of converting N-substituted sulphonic acid amides, especially N-substituted p-toluenesulphonic acid amides, into amines by hydrolysis with strong acids, for example sulphuric or hydrochloric acid. Thus for example cyclohexylamino compounds are not, like the arylsulphonamide compounds, only accessible from halogen compounds but also from other compounds having negative substituents, for example sulphonic acids or nitro compounds, by reacting these with cyclohexylamine, so that according to the new amine synthesis a far larger number of starting substances can be converted to the corresponding amines. Furthermore, in compounds containing several negative substituents of equal reactivity, such as are for example present in 1,4- or 1,5-dichloranthraquinone, it is possible, if desired, to react only one of these groups with cyclohexylamine and thus after the conversion, to obtain aminohalogenanthraquinones or the corresponding sulphonic acids. This clearly defined exchange of only one of the chlorine atoms in dichloranthraquinones is not possible with toluenesulphonamide, since in most cases a mixture of monotosylamino and ditosylamino compounds together with unchanged starting material is produced, as a result of which the aminohalogen compounds are mostly obtained in yields of less than 50%. Finally, it is possible to combine a nitrile saponification with the manufacture of the amine or alternatively to prevent a sulphonation, whereas this cannot be avoided when using the corresponding sulphonamides.

However the process described in German Specification 1,205,550 also has disadvantages. Principally there is the risk of an undesired sulphonation, which can only be avoided by using an aluminum chloride melt which is expensive and awkward to handle. Furthermore the process described in the above-mentioned Specification is a two-stage process, inasmuch as the cyclohexylaminoanthraquinones which are to be used as starting substances have in each case to be first manufactured. Finally saponificable groups, for example benzoylamino or nitrile groups are sometimes undesirably saponified under the reaction conditions.

This invention provides a new simpler process for the manufacture of aminoanthraquinones which is free of all these disadvantages. The process according to the invention is characterized by heating an anthraquinone which contains, optionally with other substituents, at least one secondary or tertiary alkylamino, aralkylamino or cycloalkylamino group or at least one cyclic amino group, in an organic solvent, if desired in the presence of an acid-binding agent and/or of an oxidizing agent, to temperatures above 100° C, if desired under elevated pressure.

Instead of using as the starting product an N-substituted aminoanthraquinone and carrying out the reaction in accordance with the scheme

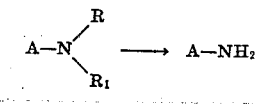

in an organic solvent e.g. nitrobenzene, in the presence or absence of an amine of the formula

the manufacture of the aminoanthraquinone can also be carried out and in the same vessel in such a manner that the substituted aminoanthraquinone is only produced as an intermediate in accordance with the scheme

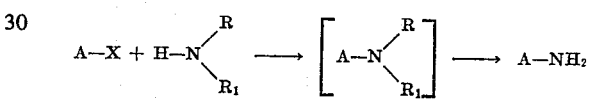

In the above formulas A denotes an optionally substituted anthraquinone residue with or without condensed carbocyclic and/or heterocyclic rings, R denotes a straight chain or branched aliphatic hydrocarbon residue or an araliphatic or cyclophaliphatic hydrocarbon residue, $R_1$ denotes a hydrogen atom or one of the residues defined under R, and R and $R_1$ may also together form a cyclic ring, and X denotes a reactive atom or a reactive group for example a nitro, hydroxy, alkoxy or sulpho group or especially a halogen atom.

As residues defined under R there may for example be mentioned those of formula $CH_3—(CH_2)_{n-1}—$ or $H—(CH_2)_{n-1}—NH—(CH_2)_m—$ or $B—(CH_2)_q—$ or

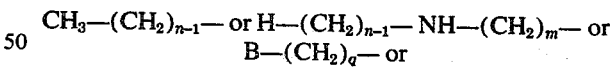

in which B denotes a phenyl or naphthyl residue, $n$ and $m$ denote integers having a value of at most 20 and $p$ and $q$ denote integers having a value of at most 4.

The compounds of formula

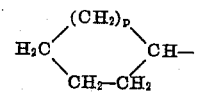

used as starting products in the present process may be obtained by reacting anthraquinones containing reactive atoms or groups with amines of formula

by known methods.

As anthraquinones which contain reactive atoms or groups and which may be used as starting products there may for example be mentioned: 1-chloro-4-benzoylaminoanthraquinone, 1-chloro-5-1-chloro-8-benzoylaminoanthraquinone, 1-chloro-3-benzoylaminoanthraquinone, 1-chloro-4aminoanthraquinone, 1-chloro-2-aminoanthraquinone, 1,4-dichloroanthraquinone, 1,5-dichloroanthraquinone, 1,4-dichloro-5-benzoylaminoanthraquinone, 1-chloro-2-cyanoanthraquinone, 1-bromo-4-methoxyanthraquinone, 1-chloro-4-anilinoanthraquinone, 1-chloroanthraquinone-6-sulphonic acid, 1,5-dinitroanthraquinone, 1-chloroanthraquinone. This list can, in accordance with the definition of A—X, be extended as desired.

As amines which are suitable for reaction with the above-mentioned anthraquinones, there may for example be mentioned: aliphatic amines having at most 20 carbon atoms in the aliphatic chain, for example $n$-octadecylamine, $n$-dodecylamine, $n$-octylamine, $n$-hexylamine, $n$-butylamine, $n$-ethylamine, isopropylamine, dodecylamino-propylamine, di-$n$-octadecylamine, di-$n$-octylamine, diethylamine, hexamethylenediamine; cycloaliphatic amines, for example cyclohexylamine, cyclooctylamine, N-butyl-cyclohexylamine, cyclic amines for example piperidine, pyrrolidine, or morpholine; araliphatic amines for example benzylamine, phenylethylamine and others which correspond to the formula

As already mentioned, it is also possible to obtain an aminoanthraquinone of formula A—NH₂ by a modification of the process in which the starting products are made simultaneously, for example, by reacting an anthraquinone of formula A—X with an amine of formula

in which A, R and R₁ have the above-mentioned significance and X denotes a reactive atom or a reactive group, optionally in the presence of an acid-binding agent and/or an oxidizing agent, in an organic solvent at temperatures above 100° and without isolating the intermediate product of the formula

In this connection, soda, N,N-dimethylaniline, aniline, pyridine or an amine of formula

may for example be used as the acid-binding agent, and if desired an oxidizing agent, for example nitrobenzene, $m$-nitrobenzene sulphonic acid, manganese dioxide, ferric chloride or arsenic acid may also be added. The reaction is carried out in an organic solvent for example nitrobenzene, trichlorobenzene or methylnaphthalene or an excess of the amine used, at temperatures above 100° C, advantageously at the boiling point of the solvent and if required in a closed vessel under elevated pressure, until the reaction mixture consists essentially of the desired aminoanthraquinone (A-NH₂).

The primary aminoanthraquinone is isolated from the reaction mixture by known methods, and the aminoanthraquinone which precipitates after the reaction solution has cooled is generally filtered, optionally recrystallized and washed. The solvent may be separated by distillation, for example steam distillation. The resulting products are valuable starting materials, for example, for the manufacture of dyestuffs, especially vat dyestuffs. They may also be directly used as dyestuffs.

In the Examples which follow the parts and percentages, unless otherwise stated, are by weight, and the temperatures are given in degrees centigrade. The melting points are uncorrected.

EXAMPLE 1

18.1 Parts of 1-chloro-4-benzoylaminoanthraquinone are stirred for 12 hours at 190° with 18.5 parts of dodecylamine (fatty amine C 12, Armeen 12 D of the Armor Industrial Chemical Company) in 80 parts by volume of nitrobenzene. After cooling the precipitate is filtered and recrystallized from a ten-fold quantity of $\gamma$-butyrolactone. The product which crystallizes in small reddish violet needles of melting point 286° is 1-amino-4-benzoylaminoanthraquinone.

EXAMPLE 2

When the 18.5 parts of dodecylamine are replaced by 27 parts of $n$-octadecylamine or 13 parts of $n$-octylamine or 11 parts of $n$-hexylamine or 52 parts of di-$n$-octadecylamine or 26 parts of Duomen C of Armor & Company (H₂N—[CH₂]₃—NH—[CH₂]₁₁CH₃) or 10 parts of cyclohexylamine, 1-amino-4-benzoylaminoanthraquinone is similarly obtained.

EXAMPLE 3

18.1 Parts of 1-chloro-4- benzoylaminoanthraquinone are stirred for 20 hours at 200° with 8 parts of $n$-butylamine in 75 parts of trichlorobenzene in an autoclave. After cooling the precipitate is filtered and recrystallized from $\gamma$-butyrolactone. 1-Amino-4-benzoylaminoanthraquinone is obtained.

EXAMPLE 4

10.8 Parts of 1-chloro-4-benzoylaminoanthraquinone are stirred for 2½ hours at 190° with 5.1 parts of piperidine in 50 parts by volume of nitrobenzene. After cooling, the precipitate is filtered and washed with nitrobenzene and methanol. 6.5 Parts of pure 1-amino-4-benzoylaminoanthraquinone are obtained.

When piperidine is replaced by 7 parts of benzylamine, 1-amino-4-benzoylaminoanthraquinone is obtained in even better yield.

When the 10.8 parts of 1-chloro-4-benzoylaminoanthraquinone are replaced by the same quantity of 1-chloro-8-benzoylaminoanthraquinone, 1-amino-8-benzoylaminoanthraquinone of melting point 245° is obtained after a reaction time of 21 hours.

EXAMPLE 5

11.9 Parts of 1,4-dichloro-5-benzoylaminoanthraquinone are stirred for 15 hours at 190° with 22.2 parts of n-dodecylamine in 50 parts by volume of nitrobenzene. After cooling the precipitated 1,4-diamino-5-benzoylaminoanthraquinone can be isolated as a reddish blue powder by filtration.

When the mixture is stirred for only 3 hours at 190° then after cooling, filtering and recrystallization of the residue from butanol a marine blue product is obtained which is 1,4-aminododecylamino-5-benzoylaminoanthraquinone of melting point 171°.

EXAMPLE 6

13 Parts of 1-chloro-2-aminoanthraquinone and 5 parts of anhydrous sodium acetate are stirred for ¾ hour at 185° in 50 parts by volume of benzylamine. After cooling the mixture is poured into water and the precipitate is filtered, dissolved in 1,000 parts by volume of hot ethanol and filtered to clarify. The filtrate is concentrated in vacuo, whereupon 1,2-diaminoanthraquinone precipitates in a crystalline form. After filtration and drying about 9 parts of 1,2-diaminoanthraquinone are obtained.

EXAMPLE 7

When in Example 4 the 1-chloro-4-benzoylaminoanthraquinone is replaced by the same quantity of 1-chloro-5-benzoylaminoanthraquinone, 1-amino-5-benzoylaminoanthraquinone is similarly obtained.

EXAMPLE 8

8.3 Parts of 1,5-dichloroanthraquinone and 11.5 parts of piperidine are stirred for 15 hours at 190° in 50 parts by volume of nitrobenzene. After cooling 1,5-diaminoanthraquinone can be isolated from the resinous mass by separation in a silica gel column using chloroform as the eluant.

EXAMPLE 9

10 Parts of 1,5-dinitroanthraquinone and 3.6 parts of benzylamine are stirred for 4 hours at 190° in the presence of 3 parts of sodium bicarbonate in 50 parts by volume of nitrobenzene. After cooling the mixture is filtered, the filtrate is mixed with 750 parts of methanol and the resulting 1-amino-5-nitroanthraquinone (4 parts) is filtered.

EXAMPLE 10

12.2 Parts of 1-chloroanthraquinone and 6 parts of hexamethylenediamine are stirred in 200 parts of amyl alcohol for 48 hours at 135° under reflux. After cooling the crystalline precipitate is filtered and dried. It consists of a mixture of 1-aminoanthraquinone and 1-hexylaminoanthraquinone which can be separated by recrystallization or chromatographically.

EXAMPLE 11

10.8 Parts of 1-chloro-4-benzoylaminoanthraquinone (0.03 mol) are stirred for 15 hours at 190° with 5.6 parts of dodecylamine (0.03 mol) and 2.9 parts of N,N-dimethylaniline (0.03 mol) in 45 parts by volume of nitrobenzene. After cooling 100 parts by volume of methanol are added, the precipitate obtained is filtered and thoroughly washed with hot methanol. About 8 parts of 1-amino-4-benzoylaminoanthraquinone are obtained.

EXAMPLE 12

10 Parts of 1-dodecylamino-4-benzoylaminoanthraquinone are stirred in 50 parts by volume of nitrobenzene for 20 hours at 190°. After cooling 10 parts by volume of methanol are added and the precipitate is filtered and washed with methanol. After drying 5.5 parts of 1-amino-4-benzoylaminoanthraquinone of melting point 279° are obtained.

The reaction time can be significantly shortened by adding one equivalent of dodecylamine.

EXAMPLE 13

10 parts of 1-cyclohexylamino-2-methylanthraquinone are stirred in 50 parts by volume of nitrobenzene for 20 hours at 185°–190°. After cooling a small amount of methanol is added and the precipitated 1-amino-2-methylanthraquinone is filtered and washed with methanol and dried. The obtained product has a melting point of 205°.

When the 1-cyclohexylamino-2-methylanthraquinone is replaced by 1-morpholino-2-methylanthraquinone or by 1-pyrrolidino-2-methylanthraquinone, 1-amino-2-methylanthraquinone is likewise obtained.

EXAMPLE 14

17.2 parts of 1-bromo-4-acetylaminoanthraquinone are stirred for 12 hours at 190° with 52.2 parts of di-n-octadecylamine in 80 parts by volume of nitrobenzene. After cooling the precipitate is filtered and washed with methanol. 9.5 parts of dried 1-amino-4-acetylaminoanthraquinone are obtained.

When the 52.2 parts of di-n-octadecylamine are replaced by 12.1 parts of α-phenylethylamine or 10.7 parts of benzylamine, 1-amino-4-acetylaminoanthraquinone is likewise obtained in an even better yield.

When the 17.2 parts of 1-bromo-4-acetylaminoanthraquinone are replaced by an equimolar amount of 1-bromo-4-thiophen(-2)-carbonylaminoanthraquinone, 1-amino-4-thiophencarbonylanthraquinone is obtained.

EXAMPLE 15

10.3 parts of 1,4-dichloro-5,8-dihydroxyanthraquinone are treated with 4 parts of benzylamine in 50 parts by volume of nitrobenzene for 15 hours at 185°–190°. After cooling a small amount of methanol is added and the product is filtered off with suction and washed with methanol. After drying about 6.5 parts of 1-amino-4-chloro-5,8-dihydroxyanthraquinone are obtained.

When instead of the 4 parts of benzylamine 20 parts are used, both chlorine atoms are replaced and the resulting product is 1,4-diamino-5,8-dihydroxyanthraquinone.

The same product is obtained if instead of 1,4-dichloro-5,8-dihydroxyanthraquione an equimolar amount of 1,4-disulfo-5,8-dihydroxyanthraquinone is used. The benzylamine may be replaced by an equimolar amount of α-phenylethylamine, di-n-octylamine, piperidine, pyrrolidine or morpholine.

If the 10.3 parts of 1,4-dichloro-5,8-dihydroxyanthraquinone are replaced by 12.8 parts of 1-chloro-4-anilido-5,8-dihydroxyanthraquinone, 1-amino-4-anilido-5,8-dihydroxyanthraquinone is obtained in a yield of 75% of the theory.

If the 10.3 parts of 1,4-dichloro-5,8-dihydroxyanthraquinone are replaced by 10 parts of 1,5-dinitroanthraquinone and 20 parts of benzylamine (or an equimolar amount of one of the above-mentioned amines) are used, 1,5-diaminoanthrquinone is obtained.

I claim:

1. A process for the manufacture of a primary α-aminoanthraquinone which is unsubstituted or substituted by chloro, bromo, nitro, sulfo, hydroxy, amino, lower alkyl, lower alkoxy, aryl or arylamino each containing up to eight carbon atoms, benzoylamino or alkylcarbonylamino containing up to eight carbon atoms, comprising heating, at a temperature above 100° C in an unsubstituted halogenated, alkylated or nitrated aromatic hydrocarbon, or amyl alcohol, an α-secondary or α-tertiary aminoanthraquinone, as defined above, in which the α-amino group is of the formula

in which R is $$CH_3—(CH_2)_{n-1}—, H—(CH_2)_{n-1}—HN—(CH_2)_m—, B—(CH_2)_q— \text{ or}$$

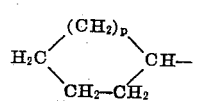

in which B is a phenyl or naphthyl radical, $n$ and $m$ are integers of at most 20 and $p$ and $q$ are integers of at most 4 and in which $R_1$ is a hydrogen atom or R, and wherein R and $R_1$ together with the nitrogen atom represent pyrrolidino, piperidino or morpholino.

2. A process as claimed in claim 1 wherein $n$ is at least 4, $p$ is 2 or 4, B is a phenyl radical and $q$ is 1 or 2.

3. A process as claimed in claim 1 wherein the α-secondary or α-tertiary amino group is dodecylamino, cyclohexylamino, morpholino or pyrrolidino.

4. A process as claimed in claim 1 wherein the inert organic solvent is an unsubstituted, halogenated, alkylated or nitrated aromatic hydrocarbon.

5. A process as claimed in claim 1 wherein nitrobenzene is used as the inert organic solvent.

6. A process as claimed in claim 1 wherein said heating is from 100° the boiling point of the solvent.

7. A process as claimed in claim 1 wherein said heating is at the reflux temperature of the solvent.

8. A process for the manufacture of a primary α-aminoanthraquinone which is unsubstituted or substituted by chloro, bromo, nitro, sulfo, hydroxy, amino, lower alkyl, lower alkoxy, aryl or arylamino each containing up to eight carbon atoms, benzoylamino or alkylcarbonylamino containing up to eight carbon atoms, comprising heating at a temperature above 100° C in an unsubstituted, halogenated, alkylated, or nitrated aromatic hydrocarbon, or amyl alcohol, an α-anthraquinone, which is unsubstituted or substituted by chloro, bromo, nitro, sulfo, hydroxy, amino, lower alkyl, lower alkoxy, aryl or arylamino each containing up to eight carbon atoms, benzoylamino or alkylcarbonylamino containing up to eight carbon atoms, and in which the α-position contains a nitro, hydroxy, alkoxy, sulfo or halogen atom in the presence of a secondary or tertiary amine of the formula

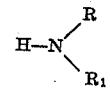

in which R is $$CH_3—(CH_2)_{n-1}—, H—(CH_2)_{n-1}—HN—(CH_2)_m—, B—(CH_2)_q— \text{ or}$$

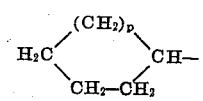

in or a naphthyl radical, $n$ and $m$ are integers of at most 20 and $p$ and $q$ are integers of at most 4 and in which $R_1$ is a hydrogen atom or R, and wherein R and $R_1$ together with the nitrogen atom represent pyrrolidino, piperidino or morpholino.

9. A process as claimed in claim 8 wherein $n$ is at least 4, $p$ is 2 or 4, B is a phenyl radical and $q$ is 1 or 2.

10. A process as claimed in claim 8 wherein the secondary or tertiary amine is an alkyl or dialkylamine of 6—18 carbon atoms, cyclohexylamine, benzylamine, α-phenethylamine, hexamethylenediamine, piperidine, pyrrolidine or morpholine.

11. A process as claimed in claim 8 wherein said heating is from 135°—200° C.

12. A process as claimed in claim 8 wherein the inert organic solvent is an unsubstituted, halogenated, alkylated or nitrated aromatic hydrocarbon.

13. A process as claimed in claim 8 wherein nitrobenzene is used as the inert organic solvent.

14. A process as claimed in claim 8 wherein said heating is at reflux temperature.

15. A process as claimed in claim 8 wherein said heating is carried out in the presence of an acid-binding agent.

* * * * *

PO-1050
(5/69)

UNITED STATES PATENT OFFICE
CERTIFICATE OF CORRECTION

Patent No. 3,700,700   Dated October 24, 1972

Inventor(s) Hans Altermatt

It is certified that error appears in the above-identified patent and that said Letters Patent are hereby corrected as shown below:

Column 8, line 47, after "in" insert --- which B is a phenyl ---.

Signed and sealed this 16th day of April 1974.

(SEAL)
Attest:

EDWARD M. FLETCHER, JR.
Attesting Officer

C. MARSHALL DANN
Commissioner of Patents